Patented May 25, 1954

2,679,458

UNITED STATES PATENT OFFICE 2,679,458

BASE MATERIALS FOR FROZEN DESSERTS

Jacob R. Katz, University City, Mo.; Margaret A. Katz, executrix of said Jacob R. Katz, deceased No Drawing. Application August 29, 1952, Serial No. 307,165

2 Claims. (Cl. 99—136)

This invention relates to certain new and useful improvements in base materials for frozen desserts.

Ice cream and similar frozen confections are manufactured in a wide variety of different types of plants ranging from the relatively few large urban plants having extensive equipment and raw material resources down to multitude of small local establishments having very limited equipment, storage facilities and the like. Furthermore, the rapid rise in the cost of butter fat in recent years has made it desperately difficult for the small plants to survive. The large plants can truck in cream from a wide milk shed and by virtue of volume purchasing as well as storage of raw materials and finished products at proper cycles of the market, establish prices for ice cream which leaves the small producer virtually no margin. In addition, even such prices are so high that the volume of retail sales has been materially reduced. Consequently, the small local plants, in order to survive, have turned to frozen desserts, that is to say a product resembling ice cream but having no butter fat content or at best a very low butter fat content and which, therefore, cannot be called "ice cream" under the statutory regulations of most states and municipalities. Such products, being cheap imitations of ice cream, ordinarily taste like imitations and are usually of poor quality, texture and taste. Furthermore, the average ice cream plant does not have the laboratory facilities to formulate a product based on edible oils as a butter fat substitute with the result that the products made from available materials according to existing recipes are of inferior quality.

It is the primary object of the present invention to provide a base material for making frozen desserts, which base material is much less expensive than butter fat and which, nevertheless, produces a frozen dessert which is smooth in texture and has the taste and appearance of high quality ice cream.

It is another object of the present invention to provide a base material for making a frozen dessert, which base material is simple and convenient to manufacture, ship, and utilize and which can be readily compounded with sugar, flavor, and the necessary aqueous ingredient to make a frozen dessert mix which can be immediately frozen by the same methods as those usually employed in freezing ice cream.

It is a further object of the present invention to provide a base material for making a frozen dessert, which base material is capable of being shipped or stored at room temperatures for relatively long periods of time without any danger of deterioration, rancidity, or the development of off-flavors.

With the above and other objects in view, my invention resides in the novel processes and compositions of matter presently described and pointed out in the claims.

The present invention resides in the combination of highly refined plain or hydrogenated edible oils, such as cocoanut oil, cottonseed oil, soya oil, peanut oil, and the like, which have a very bland taste, with sugar, dry corn solids, milk solids non-fat, natural vanilla flavor, butter flavor, and any standard ice cream stabilizer, such as vegetable gum, alginates or gelatin. These ingredients are thoroughly mixed to form a free flowing emulsion, homogenized and pasteurized. The pasteurized emulsion is then dried and, if necessary, comminuted to produce a coarse granular powder which is readily soluble in water, but is substantially non-hygroscopic and, therefore, may be readily shipped, transported, and handled. The resultant base material can be placed in any suitable container, bag, or other similar packaging means and can be stored or shipped at ordinary temperatures without any damage or deterioration. A frozen dessert can be manufactured from this base material by simply adding a proper quantity to a suitable quantity of water in a conventional mixer. The base material will be readily lixiviated and will form a smooth free-flowing viscous frozen dessert mix which can be fed directly into the freezer.

The following are illustrations of preferred formulae which may be employed in making the base material according to the present invention:

*Example I*

| | | |
|---|---|---|
| Sugar | lbs | 100 |
| Corn solids (corn sugar, corn syrup) | lbs | 55 |
| Milk solids non-fat | lbs | 90 |
| Hydrogenated cocoanut oil | lbs | 63 |
| Hydrogenated soya oil | lbs | 63 |
| Butter flavor | oz | 10 |
| Vanilla flavor (pure natural) | oz | 10 |
| Stabilizer (gelatin) | lbs | 2 |
| Propyl 3,4,5-trihydroxy benzoate | oz | 3/4 |
| Glyceryl monostearate | oz | 7 |
| Sodium phosphate | oz | 1/2 |
| Sodium citrate | oz | 1/2 |
| Magnesium hydroxide | oz | 2 |
| Salt | lb | 1 |

Example II

| Ingredient | Unit | Amount |
|---|---|---|
| Sugar | lbs | 100 |
| Corn sugar (dry) | lbs | 65 |
| Milk solids non-fat | lbs | 108 |
| Plain cocoanut oil | lbs | 103 |
| Vegetable gum stabilizer (locust bean) | lbs | 2¼ |
| Propyl 3,4,5-trihydroxy benzoate | oz | ¾ |
| Glyceryl monostearate | oz | 7 |
| Sodium phosphate | oz | ½ |
| Sodium citrate | oz | ½ |
| Magnesium hydroxide | oz | 2 |
| Salt | lb | 1 |

The following is an illustration of a preferred formula which may be employed in making a frozen dessert from the base material of the present invention:

| Ingredient | Amount |
|---|---|
| Water | 37½ gals. |
| Base material (as per Example I) | 285 lbs. |
| Flavor (i. e. chocolate, strawberry, etc.) | 15–20 oz. (to taste). |

It should be understood that changes in the methods, compositions, and combinations above set forth may be made without departing from the nature and principle of my invention.

Having thus described my invention, what I claim and desire to secure by Letters Patent is:

1. A dry powder-like base material for making a frozen confection, each particle of the powder consisting of an intimate mixture of the following ingredients in substantially the following relative proportions:

| Ingredient | Unit | Amount |
|---|---|---|
| Sugar | lbs | 100 |
| Corn solids (corn sugar, corn syrup) | lbs | 55 |
| Milk solids non-fat | lbs | 90 |
| Hydrogenated cocoanut oil | lbs | 63 |
| Hydrogenated soya oil | lbs | 63 |
| Butter flavor | oz | 10 |
| Vanilla flavor (pure natural) | oz | 10 |
| Stabilizer (gelatin) | lbs | 2 |
| Propyl 3,4,5-trihydroxy benzoate | oz | ¾ |
| Glyceryl monostearate | oz | 7 |
| Sodium phosphate | oz | ½ |
| Sodium citrate | oz | ½ |
| Magnesium hydroxide | oz | 2 |
| Salt | lb | 1 |

2. A dry powder-like base material for making a frozen confection, each particle of the powder consisting of an intimate mixture of the following ingredients in substantially the following relative proportions:

| Ingredient | Unit | Amount |
|---|---|---|
| Sugar | lbs | 100 |
| Corn sugar (dry) | lbs | 65 |
| Milk solids non-fat | lbs | 108 |
| Plain cocoanut oil | lbs | 103 |
| Vegetable gum stabilizer (locust bean) | lbs | 2¼ |
| Propyl 3,4,5-trihydroxy benzoate | oz | ¾ |
| Glyceryl monostearate | oz | 7 |
| Sodium phosphate | oz | ½ |
| Sodium citrate | oz | ½ |
| Magnesium hydroxide | oz | 2 |
| Salt | lb | 1 |

References Cited in the file of this patent

UNITED STATES PATENTS

| Number | Name | Date |
|---|---|---|
| 1,935,596 | Fear | Nov. 14, 1933 |
| 2,007,218 | Seltzer | July 9, 1935 |
| 2,065,398 | Roth et al. | Dec. 22, 1936 |
| 2,097,229 | Lucas et al. | Oct. 26, 1937 |
| 2,255,191 | Sabalitschka | Sept. 9, 1941 |
| 2,279,205 | Parsons et al. | Apr. 7, 1942 |
| 2,433,276 | Hipple et al. | Dec. 23, 1947 |
| 2,619,422 | Diamond | Nov. 25, 1952 |